United States Patent
Orisich et al.

(10) Patent No.: US 10,343,590 B2
(45) Date of Patent: Jul. 9, 2019

(54) ACTIVE HEADLIGHT SYSTEM AND METHOD

(71) Applicant: Valeo North America, Inc., Troy, MI (US)

(72) Inventors: John Orisich, Seymour, IN (US); Brant Potter, Seymour, IN (US); Emigdio Leon, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/609,068

(22) Filed: May 31, 2017

(65) Prior Publication Data

US 2018/0345848 A1   Dec. 6, 2018

(51) Int. Cl.
| | |
|---|---|
| *B60Q 1/14* | (2006.01) |
| *F21S 41/14* | (2018.01) |
| *F21S 41/16* | (2018.01) |
| *F21S 41/60* | (2018.01) |
| *F21S 41/663* | (2018.01) |
| *F21Y 115/30* | (2016.01) |

(52) U.S. Cl.
CPC ............. *B60Q 1/1423* (2013.01); *B60Q 1/14* (2013.01); *B60Q 1/143* (2013.01); *F21S 41/14* (2018.01); *F21S 41/16* (2018.01); *F21S 41/60* (2018.01); *F21S 41/663* (2018.01); *B60Q 2300/314* (2013.01); *B60Q 2300/41* (2013.01); *B60Q 2300/42* (2013.01); *B60Q 2300/45* (2013.01); *F21Y 2115/30* (2016.08)

(58) Field of Classification Search
CPC .. B60Q 1/1423; F21S 48/1145; F21S 48/1705
See application file for complete search history.

(56) References Cited

U.S. PATENT DOCUMENTS

| | | | |
|---|---|---|---|
| 2002/0003473 A1 | 1/2002 | Makita et al. | |
| 2008/0298077 A1* | 12/2008 | Naganawa | B60Q 1/085 362/466 |
| 2014/0056012 A1* | 2/2014 | Yamazaki | B60Q 1/143 362/466 |
| 2014/0084788 A1* | 3/2014 | Kim | B60Q 1/143 315/79 |
| 2015/0055668 A1* | 2/2015 | Weber | B60Q 1/085 372/38.02 |
| 2015/0246634 A1* | 9/2015 | Hall | B60Q 1/143 315/79 |
| 2015/0307045 A1 | 10/2015 | Matecki et al. | |
| 2015/0316223 A1 | 11/2015 | Ziegler et al. | |
| 2015/0377446 A1 | 12/2015 | Bhakta | |

(Continued)

*Primary Examiner* — Dedei K Hammond
*Assistant Examiner* — Raymond R Chai
(74) *Attorney, Agent, or Firm* — Oblon, McClelland, Maier & Neustadt, L.L.P.

(57) ABSTRACT

It is an object to provide a motor vehicle headlight assembly that includes a headlight module having a first luminous intensity distribution, a first additional headlight module having a second luminous intensity distribution different from the first luminous intensity distribution, and a control circuit. The control circuit may be configured to apply power to the headlight module based on one or more of a switch input and a light/dark input, and apply power to the first additional headlight module when a speed of the motor vehicle exceeds a first predetermined threshold.

9 Claims, 4 Drawing Sheets

(56) References Cited

U.S. PATENT DOCUMENTS

2016/0159273 A1    6/2016  Nakazato
2016/0281951 A1*   9/2016  Nakazato ................. B60Q 1/18
2017/0144586 A1*   5/2017  Tokida .................. F21S 41/141
2017/0305328 A1*  10/2017  Kato ................... H05B 33/0854

* cited by examiner

ACTIVE HEADLIGHT SYSTEM AND METHOD

TECHNICAL FIELD

This disclosure relates to lighting modules, and more particularly to an apparatus that includes multiple low beam headlight modules.

BACKGROUND

Motor vehicles contain numerous lighting devices for both interior and exterior illumination. For example, exterior vehicle lighting devices may perform stop light functions, taillight functions, headlight functions, daytime running light functions, dynamic bending light functions, and fog light functions. Numerous studies have found that nighttime visibility is a key to highway safety. It's been reported that more than half of all traffic deaths occur after dark.

In an effort to improve vehicle and pedestrian safety, most governments promulgate some form of safety regulations that specify motor vehicle lighting performance requirements that ensure adequate illumination of the roadway and enhance the visibility of motor vehicles on the roads so that their presence is perceived and their signals understood in daylight, in darkness, and in conditions of reduced visibility. For example, as of the date of this filing, Federal Motor Vehicle Safety Standard (FMVSS) No. 108 specifies various maximum and minimum photometric intensity values (based on angle) for headlights on vehicles operated within the Unites States. In addition to these requirements, the Insurance Institute for Highway Safety (IIHS) has its own set of tests and ratings (Headlight Test and Rating Protocol) for headlight performance. The IIHS tests and ratings seek to encourage manufacturers to improve the illumination performance in actual on-road use. IIHS evaluations have shown that the on-road illumination provided by vehicle headlights varies widely. And the majority of headlights that IIHS has rated are poor (insufficient illumination, cause excessive glare, etc.).

Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance a vehicle's illumination performance and styling.

It may be technically challenging to provide aesthetically appealing vehicle lighting devices while also meeting the necessary cost, technical, and regulatory requirements. For example, headlights on currently manufactured cars and trucks typically use significant power and require various additional components such as reflectors, lenses, cut off devices, and the like. Aesthetic lighting effects lead to an even greater number of components and complexity. Such vehicle lighting devices often are not easily adapted to the styling of the vehicle.

In recent years, a number of vehicle manufacturers have begun using light-emitting diodes (LEDs) in an effort to meet desired lighting performance, reduce power and provide improved aesthetic characteristics.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

It is an object of the present disclosure to provide a motor vehicle headlight assembly that includes a low beam headlight module having a first luminous intensity distribution, a first additional low beam headlight module having a second luminous intensity distribution different from the first luminous intensity distribution, and a control circuit. The control circuit may be configured to apply power to the low beam headlight module based on one or more of a switch input and a light/dark input, and apply power to the first additional low beam headlight module when a speed of the motor vehicle exceeds a first predetermined threshold.

It is another object to provide a method of controlling a headlight assembly of a motor vehicle. The method includes receiving a signal, applying, by a circuit, power to a low beam headlight module having a first luminous intensity distribution, detecting a speed of the motor vehicle, and applying power to a first additional low beam headlight module having a second luminous intensity distribution different from the first luminous intensity distribution when the speed of the motor vehicle exceeds a first predetermined threshold. These and/or other objects may be provided by embodiments of the disclosure disclosed herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
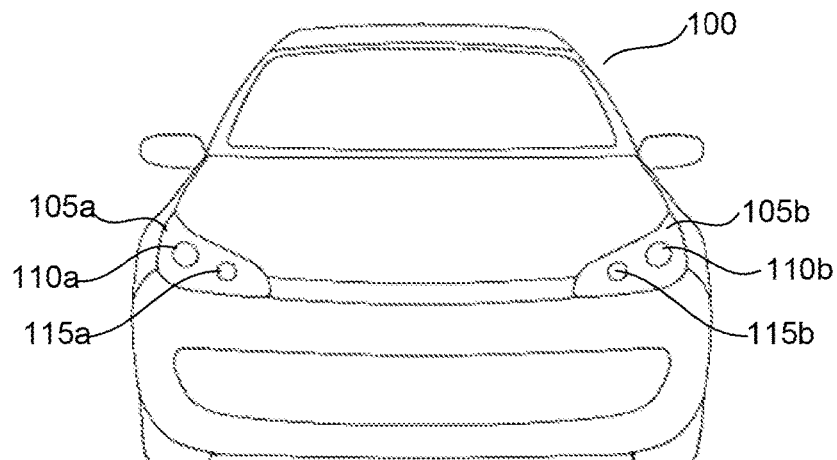
FIG. 1 illustrates the front-end of an exemplary motor vehicle.

FIG. 1 illustrates the front-end of an exemplary motor vehicle 100. Motor vehicle 100 may include two headlight assemblies 105a and 105b. Further, headlight assemblies 105a and 105b may include low beam headlights 110a and 110b (also referred to as a lower or dipped beam) and high beam headlights 115a and 115b (also referred to as a main or driving beam). Typically, the low beam headlights 110a and 110b would be used whenever other vehicles are on the road ahead of motor vehicle 100.

Figure 2:
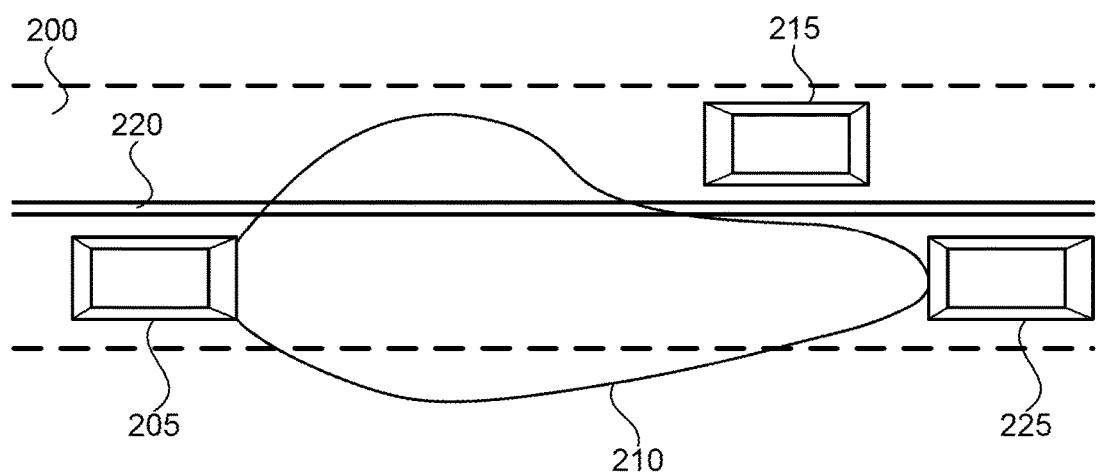
FIG. 2 is a schematic diagram that illustrates an aerial view of an exemplary roadway, a motor vehicle, and a light distribution pattern.

FIG. 2 is a schematic diagram that illustrates an aerial view of an exemplary roadway 200, motor vehicle 205, and a light distribution pattern 210 for the low beam headlights of motor vehicle 205. Light distribution pattern 210 for the low beam headlights of motor vehicle 205 may be tailored to minimize the amount of light that crosses the centerline 220 of roadway 200 to reduce dazzle (a blinding effect from the headlights) to a driver of an oncoming motor vehicle 215. Additionally, the range of the low beam headlights of motor vehicle 205 may be limited to reduce dazzle in the rear-view mirror for a driver of motor vehicle 225 ahead of motor vehicle 205 driving in the same direction.

Figure 3:
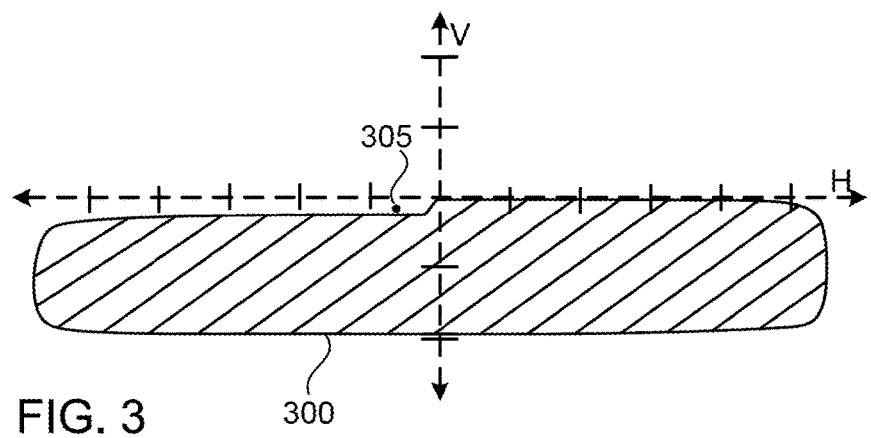
FIG. 3 illustrates an exemplary luminous intensity distribution of a typical low beam headlight.

FIG. 3 illustrates an exemplary luminous intensity distribution 300 of a typical low beam headlight as may be seen or measured at a screen spaced from, and parallel to, the front (emitting) face of the headlight. A horizontal axis H and vertical axis V are shown overlaid on luminous intensity distribution 300 in FIG. 3. The horizontal axis H and vertical axis V identify horizontal and vertical planes intersecting both the center of the headlight and the screen. The horizontal axis H and vertical axis V shown in FIG. 3 include tick marks spaced at 5° intervals.

Point 305 in FIG. 3 is a key measurement location, defined by the FMVSS No. 108 standard, for ensuring that a low beam headlight does not dazzle the driver of an oncoming motor vehicle. Point 305 is located 3.5° to the left of the vertical axis V and 0.86° below the horizontal axis H. To meet the requirements of FMVSS No. 108, a headlight low beam must have a luminous (photometric) intensity below a specified threshold (12,000 cd, for example) at point 305. FMVSS No. 108 also specifies minimum luminous intensity at other points on the luminous intensity distribution 300.

Figure 4:
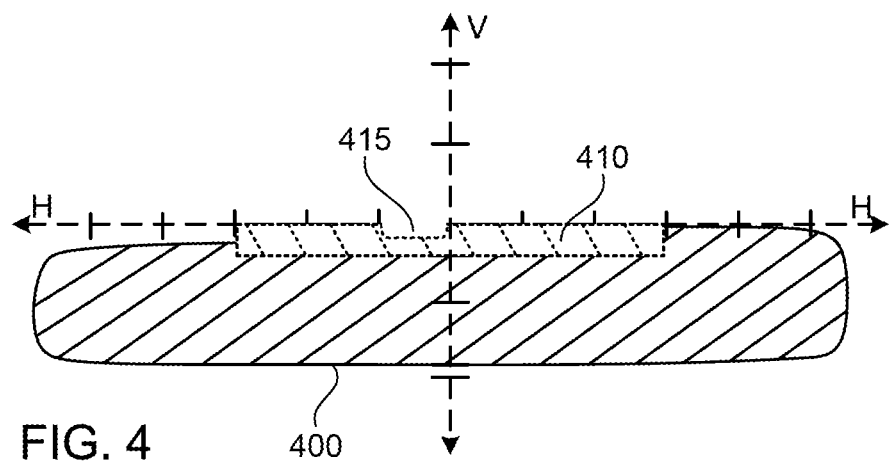
FIG. 4 illustrates an exemplary forward projection pattern of a typical low beam headlight.

FIG. 4 illustrates an exemplary forward projection pattern 400 of a typical low beam headlight similar to that shown in FIG. 3. Rectangular area 410, with notch 415, is a target zone that can be additionally illuminated to achieve higher ratings in the testing performed based on the IIHS Headlight Test and Rating Protocol.

Figure 5:
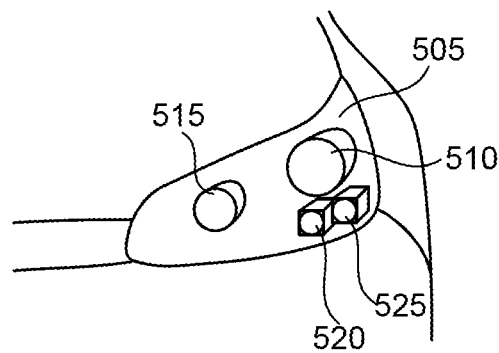
FIG. 5 illustrates an exemplary headlight assembly with one or more additional light modules.

FIG. 5 illustrates an exemplary headlight assembly 505, similar to headlight assembly 105b in FIG. 1, but with one or more additional light modules 520 and 525. In some implementations, low beam headlight 510 may include a sealed beam incandescent bulb, a halogen bulb, an LED, or a laser system. The light output from low beam headlight 510 may produce a luminous intensity distribution similar to that of luminous intensity distribution 300 shown in FIG. 3. In some embodiments, additional light modules 520 and 525 may have a laser light source and provide additional light to low beam headlight 510 and/or high beam headlight 515. In other embodiments, other additional light modules may provide additional light to high beam headlight 515.

Figure 6:
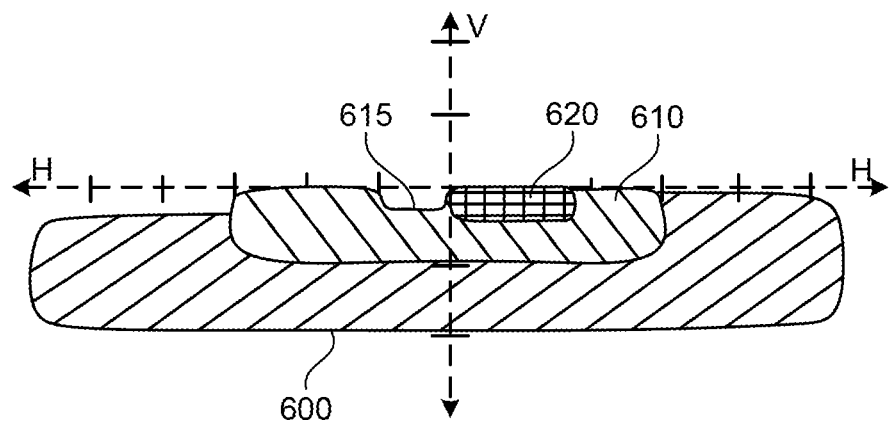
FIG. 6 illustrates the luminous intensity distribution for a number of exemplary headlight modules.

Referring to FIG. 6, a traditional low beam forward projection pattern 600 may be produced by low beam headlight 510 (FIG. 5). Additional light module 520 may provide additional light with luminous intensity distribution 610. In some embodiments, additional light module 520 may provide a higher luminous flux and/or be more narrowly focused (providing a higher luminous intensity) than that of low beam headlight 510. By providing additional light, additional light module 520 may improve the IIHS rating of the headlight assembly 505. In some embodiments, the light provided by additional light module 520 may have a spatial notch 615 that reduces the light emission around the point 305 (FIG. 3) that is located 3.5° to the left of the vertical axis V and 0.86° below the horizontal axis H. The spatial notch 615 may, for example, allow headlight assembly 505 to yield improved IIHS ratings, while still meeting the requirements of FMVSS No. 108. In some embodiments, spatial notch 615 may be located substantially to the left of vertical axis V. In other embodiments, spatial notch may be positioned symmetrically around the vertical axis V.

In some embodiments, a second additional light module 525 may be employed to further enhance the performance of headlight assembly 505. The second additional light module 525 may produce, for example, a luminous intensity distribution 620 illustrated in FIG. 6, for example, to further enhance the low beam light output of headlight assembly 505.

In some embodiments, additional light module 520 may only be activated to provide additional light when the motor vehicle exceeds a first predetermined speed. In this mode of operation, the additional light provided by additional light module 520 would allow a driver to see a longer stretch of road while driving at a speed that exceeds the first predetermined speed. Enabling the additional light module 520 above a predetermined speed may also serve to reduce the likelihood of eye damage from the higher powered, and more concentrated, illumination of additional light module 520.

In some embodiments, second additional light module 525 may only be activated to provide additional light upon the motor vehicle exceeding a second predetermined speed, where the second predetermined speed is higher than the first predetermined speed. In this mode of operations, the additional light provided by second additional light module 525 would allow a driver to see even longer stretches of road at higher driving speeds. Enabling the laser light module 525 above a second predetermined speed may further serve to reduce the likelihood of eye damage from the higher powered, and more concentrated, illumination of second additional light module 525.

The "Active" or speed activation is an additional safety feature for the light assembly. Typically this type of device will have an embedded sensor to detect if the laser diode is emitting a high energy blue laser (for example), in a case where phosphor fails or is damaged. A stationary vehicle with a damaged laser diode and concentrated beam poses a risk to an oncoming driver or observer looking at or into the device. A moving vehicle with damaged laser and concentrated beam poses less risk since exposure time is decreased. A moving vehicle with damaged laser and spread beam pattern poses least risk since exposure time and exposure levels (energy) are decreased.

Therefore, in one example, the "Active" laser concept turns OFF the laser device at speeds 0<Speed<X such that there is no chance of any exposure if laser diode fails. At higher speeds X<Speed<Y the first laser device may be activated, this beam has wider spread, so exposure time and energy are reduced. At still higher speeds Speed>Y the second laser device (concentrated) is activated, since exposure time (risk) is reduced.

Speed activation has several benefits, including reduction in the usage time of the laser diode (LD). As LDs have a relatively short lifetime when compared to LEDs, (5000 hrs vs. 50,000 hours, for example), the "active" system extends the vehicle usage life by only activating a certain speeds.

Further, safety evaluations, such as IIHS evaluations, take place at a given speed. The LD system has a high potential for glare. Higher glare value result in lower IIHS ratings for some tests. By controlling the active speed of the system this can be minimized or avoided.

When a vehicle is stopped, the need for "laser" light is reduced. Specifically, oncoming drivers and pedestrians which may encounter a high powered system can be glared; by having a speed sensitive system, it is safer because fewer pedestrians/drivers will be looking into the lamp at 30 mph, for example. Finally, speed activation of the laser appeals to consumers' driver experience. For example, as you reach "critical laser speed," suddenly there is more illumination on the road which tends to provide a "wow" factor to the driver.

Figure 7:
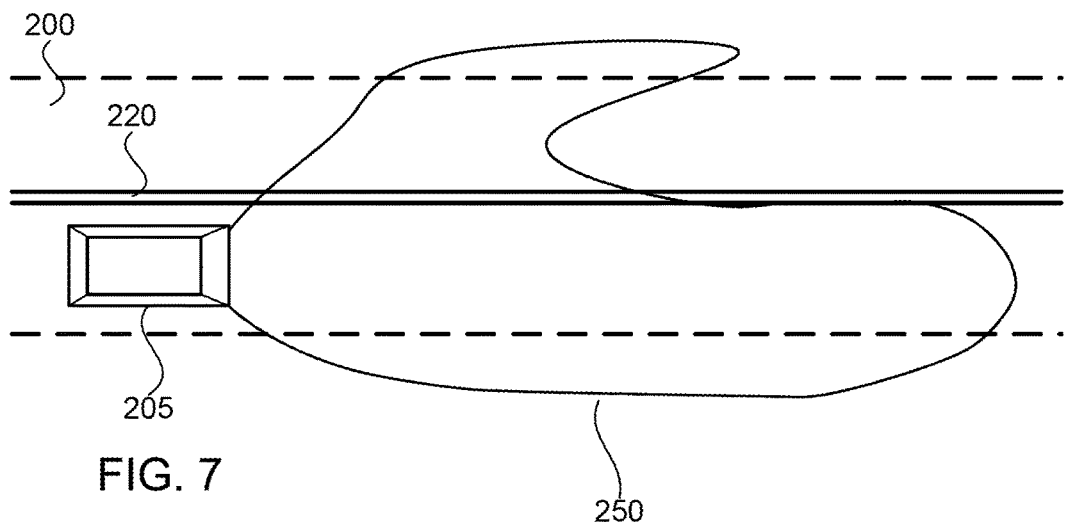
FIG. 7 is a schematic diagram that illustrates an aerial view of an exemplary roadway, a motor vehicle, and a light distribution pattern.

FIG. 7 is a schematic diagram that illustrates an aerial view of an exemplary roadway 200, motor vehicle 205, and a light distribution pattern 250 for the low beam headlights of motor vehicle 205. Light distribution pattern 250 for the low beam headlights of motor vehicle 205 may be achieved by a combination of the forward projection patterns of FIG. 6. For example, the beam distribution pattern may be tailored to minimize the amount of light that crosses the centerline 220 of roadway 200 to reduce dazzle to a driver of an oncoming motor vehicle while permitting additional light beyond the oncoming lane to illuminate objects entering the oncoming lane from the far side of roadway 206. Additionally, the range of the low beam headlights of motor vehicle 205 may be enhanced in the driver's lane when no motor vehicle is ahead of motor vehicle 205 driving in the same direction.

Figure 8:
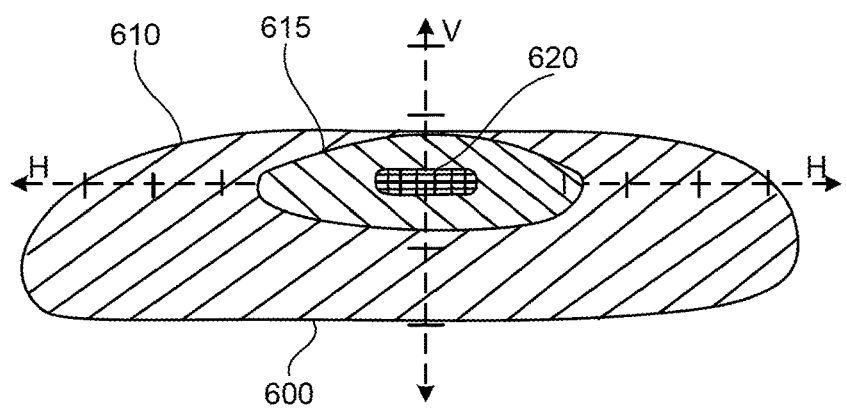
FIG. 8 illustrates an exemplary luminous intensity distribution for a number of headlight modules.

The active laser system may also be used to enhance high beam. Referring to FIG. 8, a traditional low beam forward projection pattern 600 may be produced by high beam headlight 515 (FIG. 5). Additional light module 520 may provide additional light with luminous intensity distribution 610. In some embodiments, additional light module 520 may provide a higher luminous flux and/or be more narrowly focused (providing a higher luminous intensity) than that of high beam headlight 515. By providing additional light, additional light modules may improve the IIHS rating of the headlight assembly 505.

Figure 9:
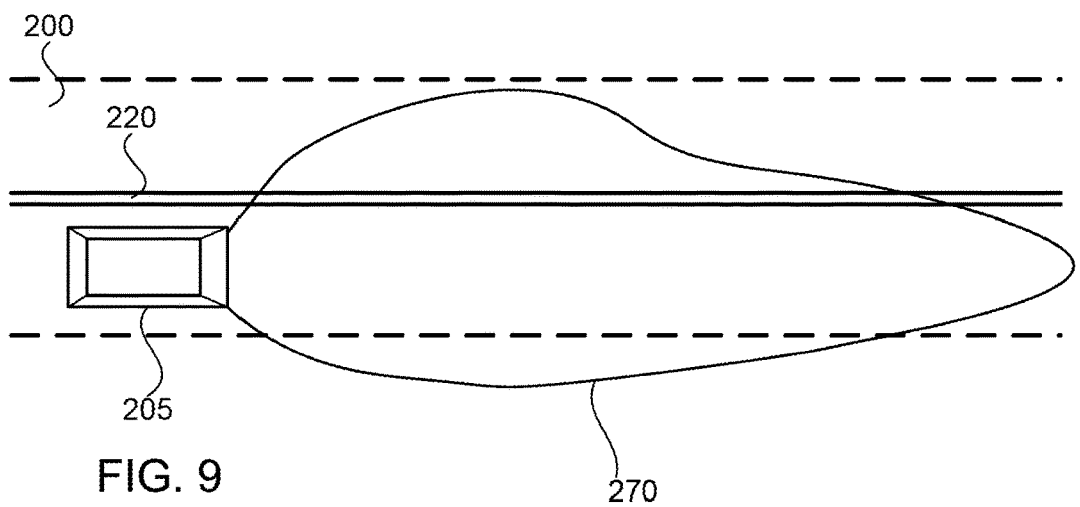
FIG. 9 is a schematic diagram that illustrates an aerial view of an exemplary roadway, a motor vehicle, and a light distribution pattern.

FIG. 9 is a schematic diagram that illustrates an aerial view of an exemplary roadway 200, motor vehicle 205, and a light distribution pattern 270 for the high beam headlights of motor vehicle 205. Light distribution pattern 270 for the high beam headlights of motor vehicle 205 may be tailored to minimize the amount of light that crosses the centerline 220 of roadway 200 at longer distances. Additionally, the range of the high beam headlights of motor vehicle 205 may be tailored to extend the amount of light in the driver's lane ahead of motor vehicle 205 when no other care is driving in the same direction.

Figure 10:
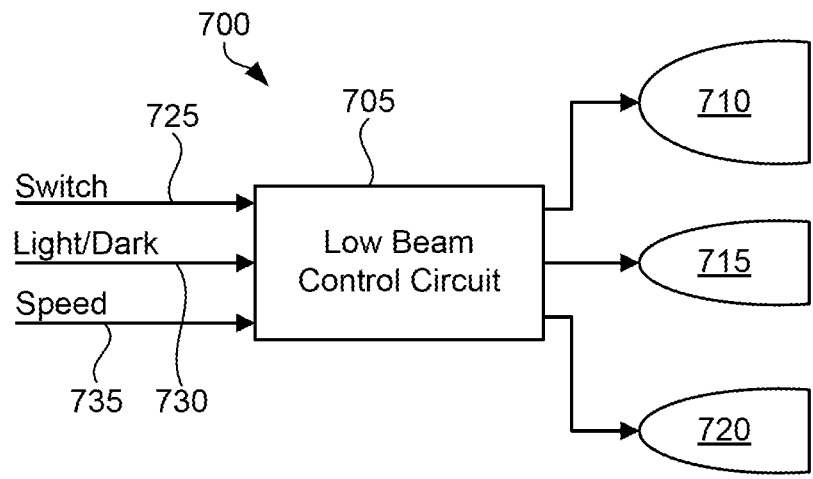
FIG. 10 illustrates a simplified functional block diagram of a headlight assembly.

FIG. 10 illustrates a simplified functional block diagram of a low beam headlight assembly 700. Low beam headlight assembly 700 may include low beam control circuit 705, low beam headlight module 710, first additional low beam headlight module 715, and, optionally, second additional low beam headlight module 720. The circuitry in low beam control circuit 705 may be configured to apply power to low beam headlight module 710 when a switch input 725 indicates that a headlight should be turned on (for example, when a driver switches on the headlight switch). In some embodiments, low beam control circuit 705 may be configured to automatically apply power to low beam headlight module 710 when the motor vehicle is on and input 730 from a light/dark sensor indicates that the ambient light level outside of the vehicle is below a predetermined threshold.

In some embodiments, the circuitry in low beam control circuit 705 may also be configured to apply power to first additional light module 715 when power has been applied to low beam headlight module 710 and the speed input 735 indicates that the speed of the motor vehicle has exceeded the first predetermined speed. Furthermore, in some embodiments, the circuitry in low beam control circuit 705 may also be configured to apply power to second additional light module 720 when power has been applied to low beam headlight module 710 and the speed input 735 indicates that the speed of the motor vehicle has exceeded the second predetermined speed.

It should be noted that while FIG. 10 illustrates low beam control circuit 705 as included within low beam headlight assembly 700, low beam control circuit 705 could also be located apart from low beam headlight assembly 700. Moreover, a single low beam control circuit 705 may be employed for both a right and left low beam headlight assembly such that the low beam headlight modules, the first additional light modules, and the second additional light modules may be driven in a synchronized manner. Still further, it is to be understood that a similar control circuit scheme may be used on control enhancement of a high beam.

Figure 11:
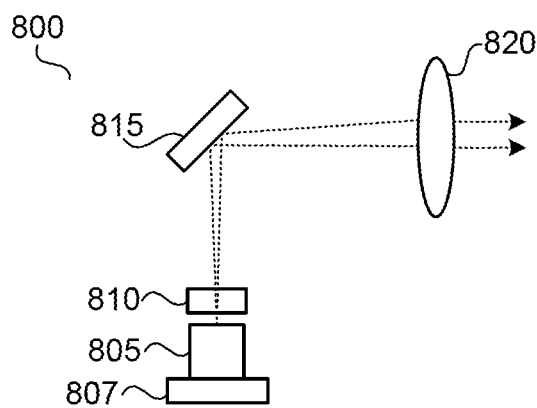
FIG. 11 illustrates a simplified functional block diagram of an exemplary additional light module.

FIG. 11 illustrates a simplified functional block diagram of an exemplary additional light module 800. In some embodiments, additional light module 800 may include a laser emitter 805, a phosphor plate 810, a mirror 815, and a lens 820. Laser emitter 805 may, in some implementations, include a laser diode with emission in the blue visible spectrum (for example, with a wavelength in the range of 360 and 480 nm). Laser emitter 805 may, in some embodiments, be mounted on a heatsink 807. The light from laser emitter 805 may be directed through phosphor plate 810. Phosphor plate 810 may include phosphors such as, but not limited to, YAG, LuAG, nitride, oxynitride, and the like. Phosphor plate 810 may convert the light from laser emitter 805 to a white light. In place of phosphor plate 810, laser emitter 805 may be coated with a phosphor layer of similar materials. The light from laser emitter 805 may then be reflected by mirror 815. Mirror 815 may, in some embodiments, include actuators and/or vibrators configured to broaden or tailor the shape of the light beam from laser emitter 805. The light reflected from mirror 815 may then pass through lens 820. Other components may be employed in additional light module 800 to detect failure of phosphor plate 810 or mirror 815 to ensure the safety of additional light module 800.

Those skilled in the art will recognize that more than two additional light modules may be used without departing from the spirit of the present disclosure. In some embodiments, each additional light module may have a specific predetermined speed at which it may be energized, and each additional light module may have a specific luminous intensity distribution which may be the same or different from the luminous intensity distribution of other additional light modules.

Advantageously the embodiments described herein are particularly suited for providing additional illumination from the front of the vehicle.

This invention, including all embodiments shown and described herein, could be used alone or together and/or in combination with one or more of the features covered by one or more of the claims set forth herein, including but not limited to one or more of the features or steps mentioned in the Summary and the claims.

While the system, apparatus, process and method herein described may constitute preferred embodiments, it is to be understood that the implementation is not limited to this precise system, apparatus, process and method, and that changes may be made therein without departing from the scope which is defined in the appended claims.

The invention claimed is:

1. A motor vehicle headlight assembly comprising: a low beam headlight module providing a first luminous flux; a first additional low beam headlight module providing a second luminous flux which is more narrowly focused than the first luminous flux such that the second luminous flux lies entirely within the first luminous flux as seen in a plane parallel to an emitting face of the headlight assembly; a control circuit configured to apply power to the low beam headlight module based on one or more of a switch input and a light/dark input, and apply power to the first additional low beam headlight module only when a speed of the motor vehicle exceeds a first predetermined threshold; and a second additional low beam headlight module providing a third luminous flux which is different from the first luminous flux and wherein the control circuit is further configured to apply power to the second additional low beam headlight module when the speed of the motor vehicle exceeds a second predetermined threshold, wherein the second predetermined threshold is greater than the first predetermined threshold, and wherein the third luminous flux is more narrowly focused than the first and second luminous flux such that the third luminous flux lies entirely within the first and second luminous flux as seen in the plane parallel to the emitting face of the headlight assembly.

2. The motor vehicle headlight assembly of claim 1, wherein at least one of the first additional low beam headlight module and the second additional low beam headlight module includes a laser light source.

3. The motor vehicle headlight assembly of claim 1, wherein the first additional low beam headlight module is configured to reduce light emission around a point located 3.5° to the left of a vertical axis and 0.86° below a horizontal axis.

4. A method of controlling a headlight assembly of a motor vehicle, the method comprising: receiving, at a circuit, a signal indicating that a headlight should be turned on; applying, by the circuit, power to a low beam headlight module providing a first luminous flux; detecting a speed of the motor vehicle; applying power to a first additional low beam headlight module providing a second luminous flux which more narrowly focused than the first luminous flux such that the second luminous flux lies entirely within the first luminous flux as seen in a plane parallel to an emitting face of the headlight assembly, only when the detected speed of the motor vehicle exceeds a first predetermined threshold; and applying power to a second additional low beam headlight module providing a third luminous flux different from the first luminous flux when the detected speed of the motor vehicle exceeds a second predetermined threshold, wherein the second predetermined threshold is greater than the first predetermined threshold, wherein the third luminous flux is more narrowly focused than the first and second luminous flux such that the third luminous flux lies entirely within the first and second luminous flux as seen in the plane parallel to the emitting face of the headlight assembly.

5. The method of claim 4, wherein at least one of the first additional low beam headlight module and the second additional low beam headlight module includes a laser light source.

6. The method of claim 4, wherein the first additional low beam headlight module is configured to reduce light emission around a point located 3.5° to the left of a vertical axis and 0.86° below a horizontal axis.

7. A motor vehicle comprising: a control circuit; one or more headlight assemblies, wherein each headlight assembly is electrically connected to the control circuit and wherein each headlight assembly includes: a low beam headlight module providing a first luminous flux; a first additional low beam headlight module providing a second luminous flux which is more narrowly focused than the first luminous flux such that the second luminous flux lies entirely within the first luminous flux as seen in a plane parallel to an emitting face of the headlight assembly; wherein the control circuit is configured to apply power to the low beam headlight module of each of the one or more headlight assemblies based on one or more of a switch input and a light/dark input, and apply power to the first low beam additional headlight module of each of the one or more headlight assemblies only when a speed of the motor vehicle exceeds a first predetermined threshold, and a second additional low beam headlight module providing a third luminous flux different from the first luminous flux, wherein the third luminous flux is more narrowly focused than the first and second luminous flux such that the third luminous flux lies entirely within the first and second luminous flux as seen in the plane parallel to the emitting face of the headlight assembly.

8. The motor vehicle of claim 7, wherein the control circuit is further configured to apply power to the second additional low beam headlight module of each of the one or more headlight assemblies when a speed of the motor vehicle exceeds a second predetermined threshold, wherein the second predetermined threshold is greater than the first predetermined threshold.

9. The motor vehicle of claim 7, wherein the first additional low beam headlight module and the second additional low beam headlight module of each of the one or more headlight assemblies includes a laser light source.

* * * * *